Patented Feb. 10, 1925.

1,525,516

UNITED STATES PATENT OFFICE.

WILLIAM H. SMITH, OF EAST CLEVELAND, OHIO.

FAUCET.

Application filed January 5, 1921. Serial No. 435,058.

*To all whom it may concern:*

Be it known that I, WILLIAM H. SMITH, a citizen of the United States, residing at East Cleveland, in the county of Cuyahoga and State of Ohio, have invented a certain new and useful Improvement in Faucets, of which the following is a full, clear, and exact description, reference being had to the accompanying drawings.

This invention relates to faucets; and especially to those employed for the dispensing of inflammable or corrosive liquids such as upon oil tanks and tank wagons, although not limited to such use; the objects of the invention are the provision of a device of this character which shall be all metal, which shall be tight at all times and which shall be self-closing so as to remain open only while being forcibly held in such condition by the operator. Other objects of the invention are the provision of a faucet employing a type of valve not before used in this relation; the provision of a self-closing gate valve; while further objects and advantages will become apparent as the description proceeds.

Figure 1:
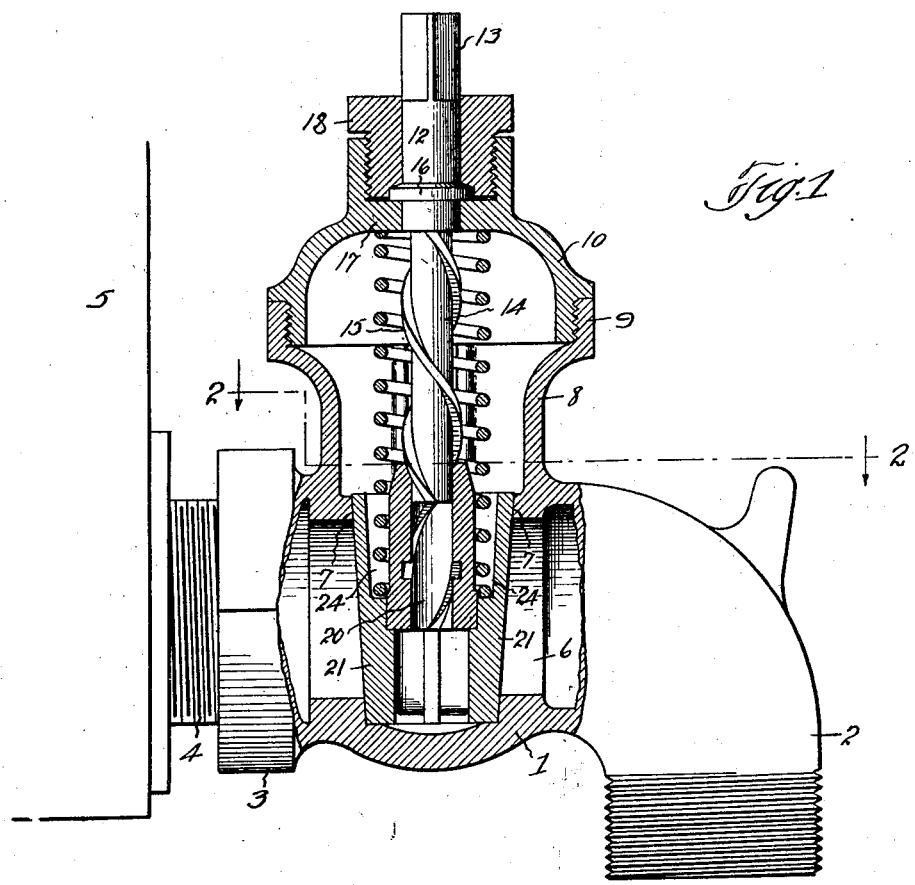
Figure 2:
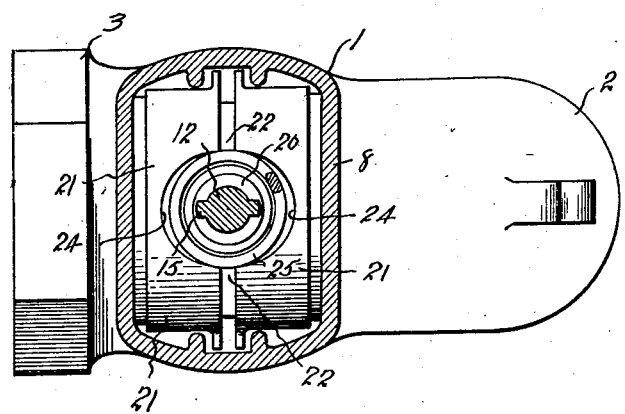
Figure 3:
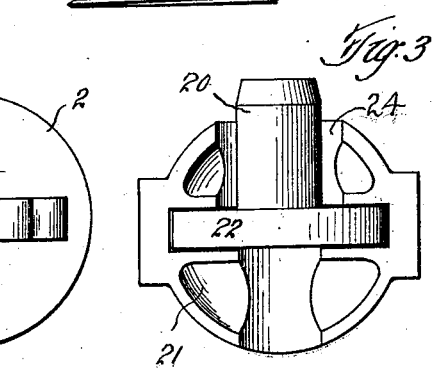

In the drawings accompanying and forming a part of this application I have illustrated one embodiment of my said invention, although without intent to limit myself to this one construction since other specific forms are included within my invention. Fig. 1 illustrates my improved faucet in connection with an oil or gasoline tank, the operating parts of the faucet being shown in section. Fig. 2 is a sectional view corresponding to the broken line 2—2 of Fig. 1; and Fig. 3 is a transverse sectional view through the center of the stem.

In these drawings, 1 represents the body of the faucet, having at one end the down-turned spout 2 and at the other end the polygonal threaded collar 3, adapted to be screwed on the threaded nipple 4 of a wagon tank 5 or other suitable receptacle or conduit.

Extending through this body from end to end is a liquid passage 6 intersected by an upwardly-opening, wedge-shaped recess defined between the flat, inclined seats 7—7. The top of the faucet body is provided with an upwardly projecting hollow neck 8 surrounding this recess and merging at its upper end with the screw-threaded collar 9 to which is attached the bonnet 10. Journaled in this bonnet is the upright spindle 12 having at its upper end the prismatic portion 13 for the reception of a suitable handle whereby it may be turned, and having at its lower part a portion 14 which depends into said wedge shaped recess and is formed with a quick-pitch thread 15 which is preferably of a multiple nature, here shown as comprising two inter-wound spirals, although the number is not important. Near its upper end this spindle is formed with a flange 16 interposed between a fixed flange 17 and a removable gland-nut 18 carried by the bonnet so as to prevent longitudinal movement of the spindle.

Loosely threaded on the lower end of the spindle is a nut 20 about which are assembled the mating halves 21—21 of the gate-valve member, the nut being formed with extending ears 22—22 which fit in suitable sockets in the valve member so that the latter will follow the movements of the former. Each of the members 21 is formed around the nut with a counterbore 24 for the reception of the coil spring 25 which surrounds said stem and has its upper end seated against the hollow inside of the bonnet and its lower end seated upon the ears 22—22 of the nut.

With the construction described the faucet can be made tight without the use of seating composition of any kind which is particularly objectionable in connection with inflammable or corrosive liquids because the same generally have a corrosive effect upon such material; the effect of the spring is to hold the faucet tightly shut at all times excepting while the attendant is present and holding it open, thereby preventing accidents from the over-running of receptacles; and the mode of application of the spring to the gate-valve members at a point midway of their diameter produces a balanced action of the same and avoids binding and disarrangement thereof. It will be understood however, that changes in details of construction can be made within the scope of my invention.

In case the spring should break as sometimes happens in such devices the valve can still be operated by hand until repairs can be made and without losing the contents of the tank; likewise if the stem should be broken the independent connection of the spring to the valve member holds it closed and saves the load.

Having thus described my invention, what I claim is:

1. In a self-closing gate valve, in combination, a pair of circular, wedge-shaped valve members, an internally threaded nut engaged with said members and projecting diametrically thereof, the adjacent faces of said members being formed around said nut with a counterbore which extends substantially half-way across said faces, a spindle having a quick-pitch thread engaging said nut, and a coil spring surrounding said spindle and projecting into said counterbore and effective to return said members to closed position.

2. In a self-closing gate valve, in combination, a pair of circular, wedge-shaped valve members, an internally threaded nut located between said members and having laterally projecting portions, said members having recesses receiving said projections and the adjacent faces of said members being formed around the upper part of said nut with a counterbore which merges with said recesses, a spindle having a quick-pitch thread engaging said nut, and a compression spring surrounding said spindle and nut and effective to return said members to closed position and engaging the projecting portions of said nut.

In testimony whereof, I hereunto affix my signature.

WILLIAM H. SMITH.